United States Patent [19]
Ehrhart et al.

[11] Patent Number: 5,867,970
[45] Date of Patent: Feb. 9, 1999

[54] HEADER LIFT SYSTEM FOR HARVESTERS

[75] Inventors: Philip J. Ehrhart, Narvon; Donald L. Osborne, Quarryville, both of Pa.

[73] Assignee: New Holland North America, Inc., New Holland, Pa.

[21] Appl. No.: 934,606

[22] Filed: Sep. 22, 1997

Related U.S. Application Data

[62] Division of Ser. No. 673,677, Jun. 25, 1996, Pat. No. 5,806,291.

[60] Provisional application No. 60/000,817 Jun. 26, 1995.

[51] Int. Cl.$^6$ ............................. A01D 34/66; A01D 34/76
[52] U.S. Cl. ................................ 56/6; 56/13.5; 56/15.2; 56/208
[58] Field of Search .......................... 56/6, 7, 13.5, 13.6, 56/15.2, 16.4, 14.4, 16.9, 17.2, 295, 192, 255, 235, 208, 330, DIG. 1, DIG. 6, DIG. 15; 172/395, 429

[56] References Cited

U.S. PATENT DOCUMENTS

| | | | |
|---|---|---|---|
| 4,840,020 | 6/1989 | Oka | 56/15.2 |
| 4,896,484 | 1/1990 | Jennings | 56/6 |
| 5,722,222 | 3/1998 | Wattens et al. | 56/6 |

*Primary Examiner*—Thomas B. Will
*Assistant Examiner*—Robert Pezzuto
*Attorney, Agent, or Firm*—Larry W. Miller; J. William Stader; Frank A. Seemar

[57] ABSTRACT

A pull-type mower conditioner includes a crop harvesting header vertically movable relative to the frame of the mower conditioner between a raised transport position and a lowered operative position, a lift mechanism to effect the movement of the crop harvesting header relative to the frame, and a transport latch mechanism to control the locking of the lift mechanism in the transport position. The lift linkage incorporates a cam mechanism that serves as an upper flotation limit under normal operating conditions and automatically converts into a device for securing the header in the transport position when the header is moved into the transport position.

8 Claims, 10 Drawing Sheets

HEADER LIFT SYSTEM FOR HARVESTERS

This application is a division of U.S. patent application Ser. No. 08/673,677, filed Jun. 25, 1996, now U.S. Pat. No. 5,806,291, which is a continuation of Provisional Application No. 60/000,817, filed Jun. 26, 1995.

CROSS-REFERENCE TO RELATED APPLICATIONS

BACKGROUND OF THE INVENTION

This invention relates generally to a pull-type machine for harvesting crops from a field and, more particularly, to a lift linkage that defines header flotation limits and that can be secured for transport purposes.

Trailed harvesting implements, such as mower conditioners, with lift systems that are positioned with one or more hydraulic cylinders, require a mechanical device for positively locking the implement in the raised position to insure that during transport on the highway the implement will not lower due to a hydraulic leak or failure. It is desirable that a mechanism be provided to permit the operator to engage a lever before getting onto the tractor to start operation of the tractor and harvesting implement so that the locking device will automatically engage when the implement is raised into the transport position. It is also preferable that the mechanism bias the locking device in the locked position.

It would be further preferable that the same mechanism permit the operator, having arrived at the field, to engage the mechanism before getting into the tractor so that the locking mechanism will unlock when the implement is raised fully, thereby allowing the operator to commence use of the implement without again dis-mounting from the tractor to unlock the locking device. It would also be desirable that the mechanism also hold the locking device in the unlocked position such that the locking device will not engage when the implement is raised during field operation to clear the cut crop or an obstacle.

Crop harvesting headers are suspended from the harvester frame for flotational movement relative thereto. It is desirable to provide a device to define the range of operation for the flotational movement of the header. It is further desirable that the flotation limit be convertible to secure the header when in the transport position to prevent the header from bouncing during transportation thereof over the ground and, thereby, contacting other structural components of the harvester and effecting damage thereof.

SUMMARY OF THE INVENTION

It is an object of this invention to overcome the aforementioned disadvantages of the prior art by providing a lift linkage that defines an operating range for header flotation movement.

It is a feature of this invention that the lift linkage includes a cam mechanism that is rotatable when the lift linkage moves to the transport position to convert from an upper flotation limit to a device for securing the header in the transport position.

It is an advantage of this invention that the cam mechanism automatically converts from an upper flotation stop to a device for securing the header in the transport position when the header is raised to the transport position.

It is another object of this invention to provide a lift linkage that serves to secure the header while in the transport position.

It is still a further object of this invention to provide a lift linkage for a pull-type harvesting implement which is durable in construction, inexpensive of manufacture, carefree of maintenance, facile in assemblage, and simple and effective in use.

These and other objects, features and advantages are accomplished according to the instant invention by providing a pull-type mower conditioner having a crop harvesting header vertically movable relative to the frame of the mower conditioner between a raised transport position and a lowered operative position, a lift mechanism to effect the movement of the crop harvesting header relative to the frame, and a transport latch mechanism to control the locking of the lift mechanism in the transport position. The lift linkage incorporates a cam mechanism that serves as an upper flotation limit under normal operating conditions and automatically converts into a device for securing the header in the transport position when the header is moved into the transport position.

BRIEF DESCRIPTION OF THE DRAWINGS

The advantages of this invention will be apparent upon consideration of the following detailed disclosure of the invention, especially when taken in conjunction with the accompanying drawings wherein.

DETAILED DESCRIPTION OF THE PREFERRED EMBODIMENT

Figure 1:
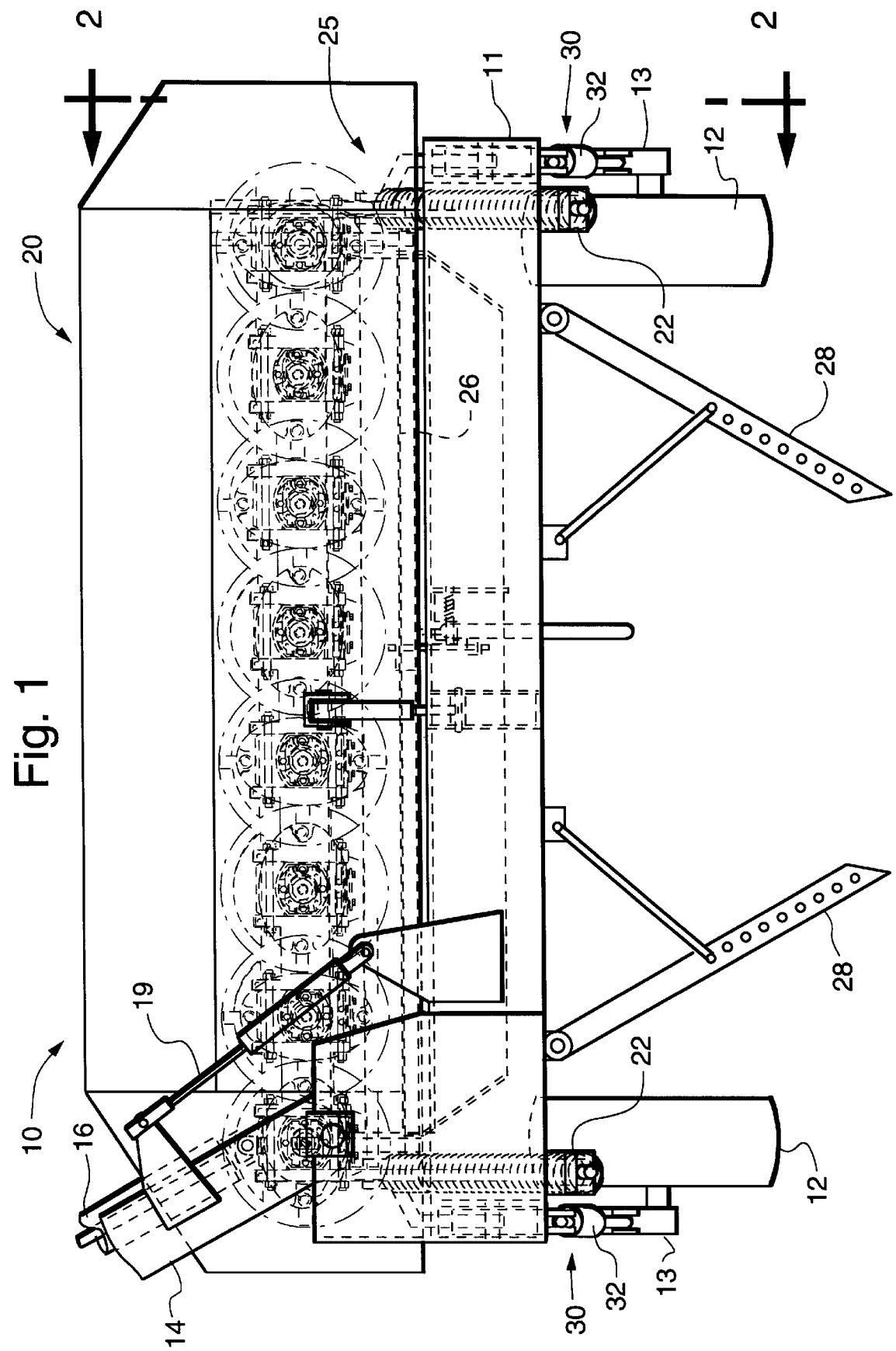
FIG. 1 is a top plan view of a disc mower conditioner incorporating the principles of the instant invention, the conventional draft tongue and PTO shaft being broken off for purposes of clarity.
Figure 2:
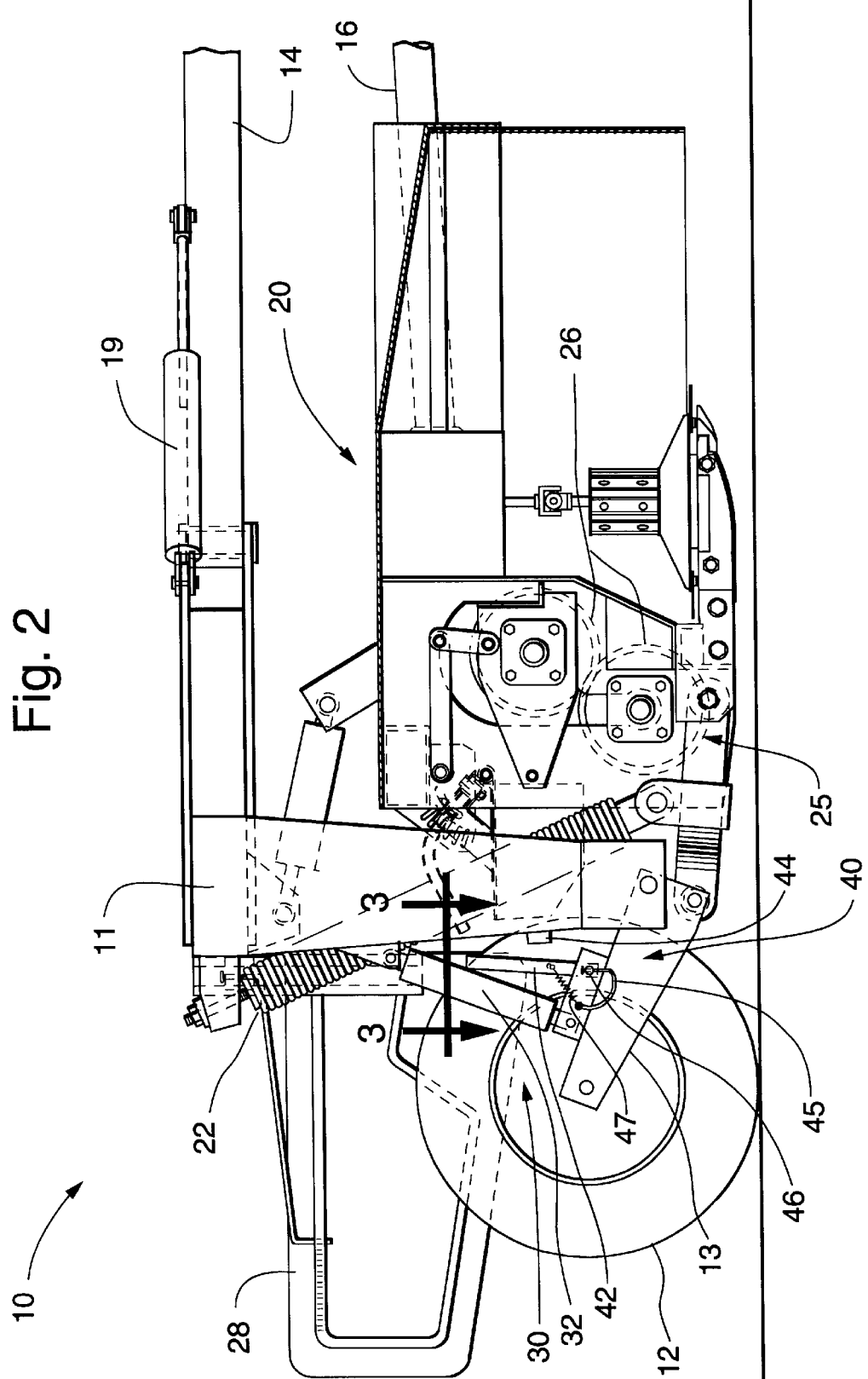
FIG. 2 is a cross-sectional view of the disc mower conditioner taken along lines 2—2 of FIG. 1 to depict a right side elevational view of the disc mower conditioner.

Referring now to the drawings and, particularly, to FIGS. 1 and 2, the disc mower conditioner utilizing a modular disc cutterbar and incorporating the principles of the instant invention can best be seen. Left and right references are used as a matter of convenience and are determined by standing at the rear of the machine facing forwardly into the normal direction of travel.

The disc mower conditioner 10 is provided with a generally conventional frame 11 mobilely supported over the ground by a pair of transversely spaced wheels 12 and a draft tongue 14 attached to the tractor (not shown), as is known in the art. Rotational power is delivered from the tractor (not shown) to the disc mower conditioner 10 by a power-take-off (PTO) shaft 16 rotatably coupled with the tractor in a conventional manner. As is known in the art, the draft tongue 14 is pivotally connected to the implement frame 11, the pivotal movement thereof being controlled by a hydraulic cylinder 19 interconnecting the tongue 14 and the frame 11. Through manipulation of the hydraulic cylinder 19, the disc mower conditioner 10 can be moved between a transport position behind the tractor and an operative position outboard to the right of the tractor so that the disc mower conditioner 10 can be operated without the tractor (not shown) running over the standing crop.

The frame 11 supports a crop harvesting header 20 suspended therefrom by a flotation mechanism 22 so that the header 20 can move vertically relative to the frame 11 to enable the header 20 to follow ground undulations and to allow the header 20 to be raised into an elevated transport position. The header 20 rotatably supports a conditioning mechanism 25, preferably in the form of a pair of intermeshing conditioning rolls 26 that receive severed crop therebetween and conditions the severed crop material. The conditioning rolls 26 discharge the crop material rearwardly into a pair of laterally spaced windrow shields 28 that consolidate the severed and conditioned crop into a windrow formed behind the implement 10.

A header lift mechanism 30 is provided to effect the vertical movement of the crop harvesting header between the raised transport position and the lowered operative position. The lift mechanism 30 includes a hydraulic cylinder 32 associated with each respective laterally spaced the wheel arm 13 pivotally interconnecting each respective wheel 12 and the frame 11. The hydraulic lift cylinders 32 interconnect the respective wheel arms 13 and the frame 11 such that an extension of the lift cylinders 32 effects a raising of the frame 11 relative to the ground engaging wheels 12. Since the header 20 is suspended from the frame 11, the header 20 is also raised into an elevated transport position.

Referring now to FIGS. 3–6, the transport latch mechanism 40 for locking and unlocking the lift mechanism 30 can best be seen. The transport latch mechanism 40 includes a lock link 42 pivotally connected to the wheel arm 13 and movable between a locking and unlocking position. When in the locking position, as shown in phantom in FIG. 3 and in solid lines in FIGS. 4–6, the lock link 42 is engageable against a stop 44 affixed to the frame 11 to prevent the frame 11 from further lowering to the operative position. When retracted back to the unlocking position, as shown in solid lines in FIG. 3 and in phantom in FIG. 4, the lock link 42 clears the stop 44 allowing the frame 11 to freely move between the raised and lowered positions.

The biasing lever 45 is attached to the pivot pin 46 securing the lock link 42 to the wheel arm 13. The biasing lever 45 can be positioned to bias the lock link 42 toward either the locking or unlocking positions. The biasing lever 45 pivots in a hole in the pivot pin 46. An extension spring 47 is connected to the biasing lever 45 and the lock link 42. The biasing lever 45 positions the extension spring 47 in a position to apply a force to either bias the lock link 42 toward the stop 44, and therefore the locking position, or away from the stop 44, and therefore in the unlocking position. The movement of the biasing lever 45 from one position to the other places the spring 47 in an over center orientation to keep the lock link 42 in the desired position irrespective of the movements undertaken by the frame 11.

Figure 5:
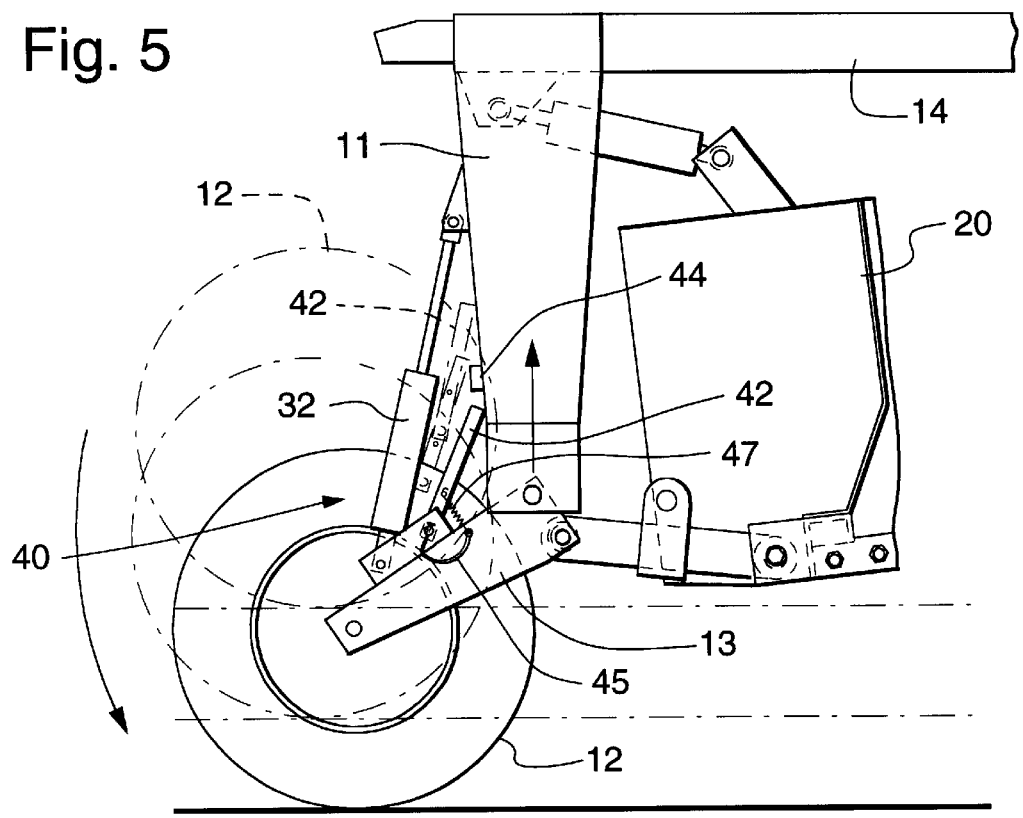
FIG. 5 is a partial side elevational view of the mower conditioner similar to that of FIG. 4 but with the header being raised into the transport position, the movements of the frame of the mower conditioner relative to the header while the header is being raised into the transport position.
Figure 6:
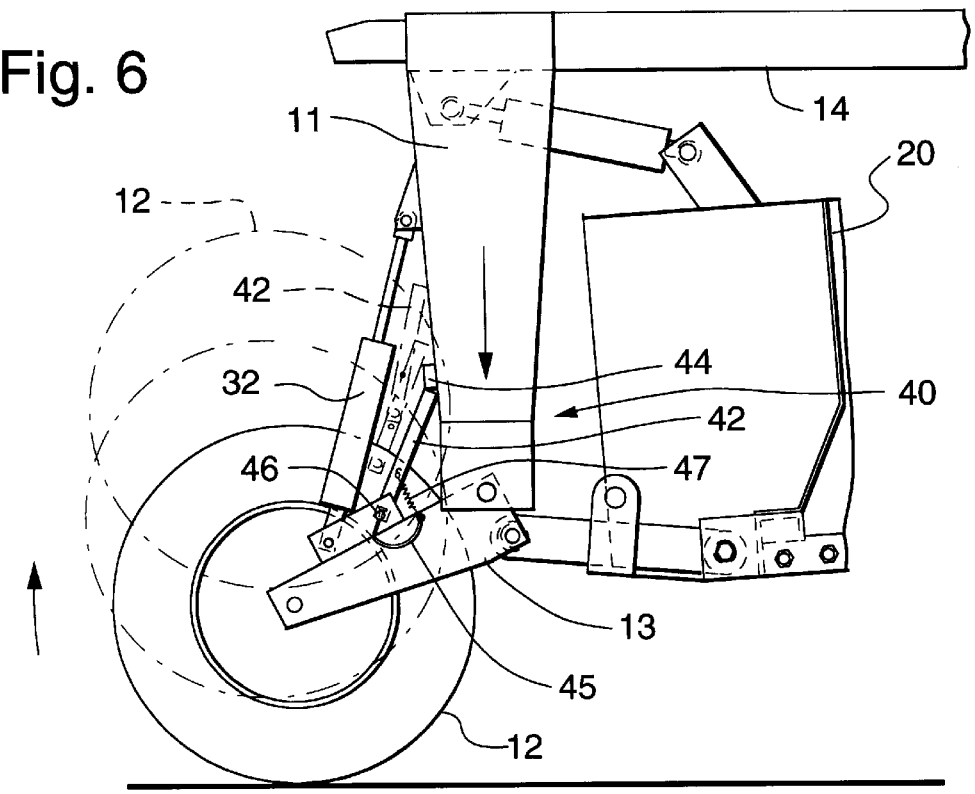
FIG. 6 is a partial side elevational view of the mower conditioner similar to that of FIG. 5, the relative movement of the frame and transport latch to lock the header into the raised transport position being shown in phantom.
Figure 7:
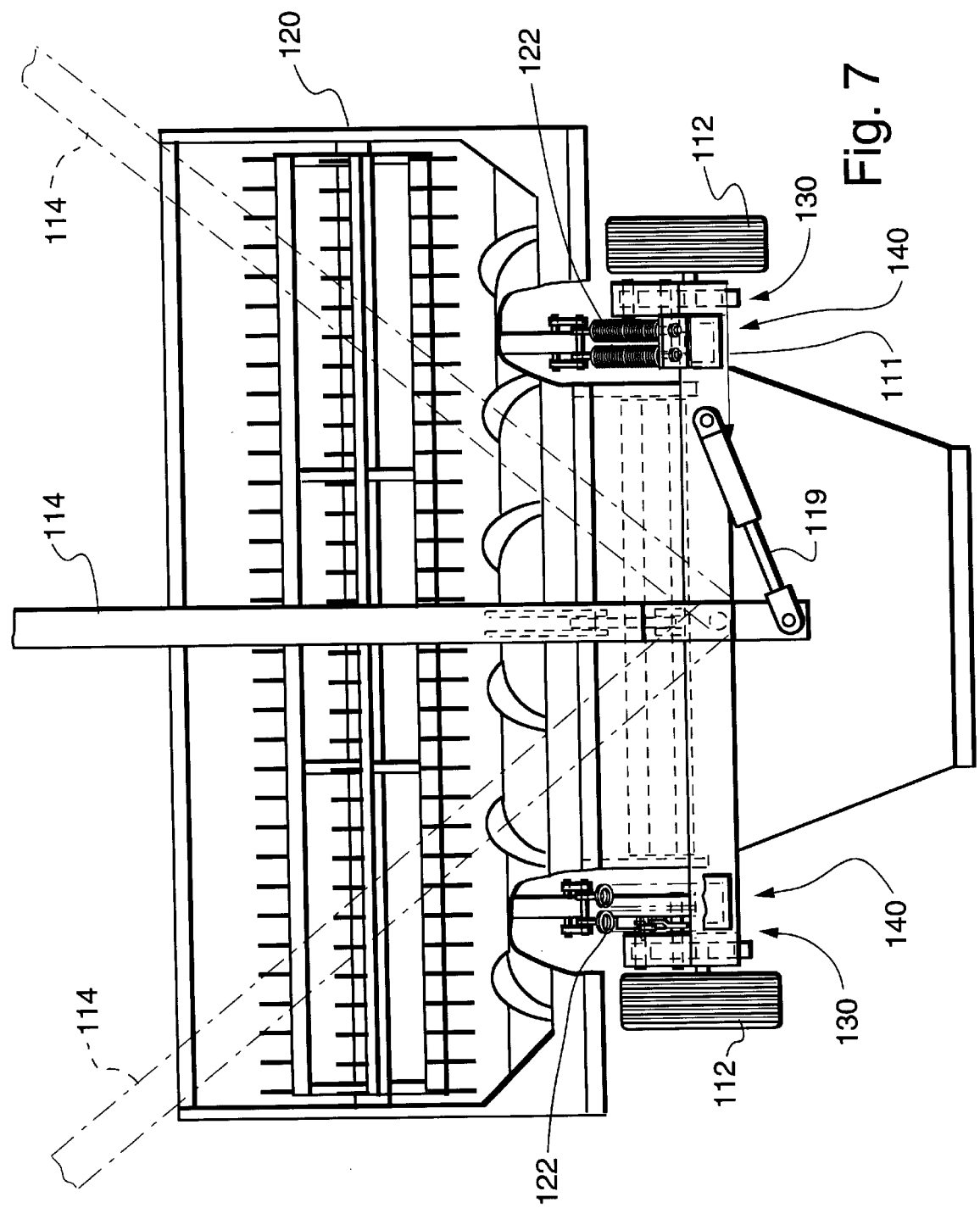
FIG. 7 is a top plan view of a center pivot harvester incorporating the principles of the instant invention, the tongue being broken off for purposes of clarity, portions of the header structure being broken away to better shown the header support arm structure, the swinging movements of the draft tongue being shown in phantom.
Figure 8:
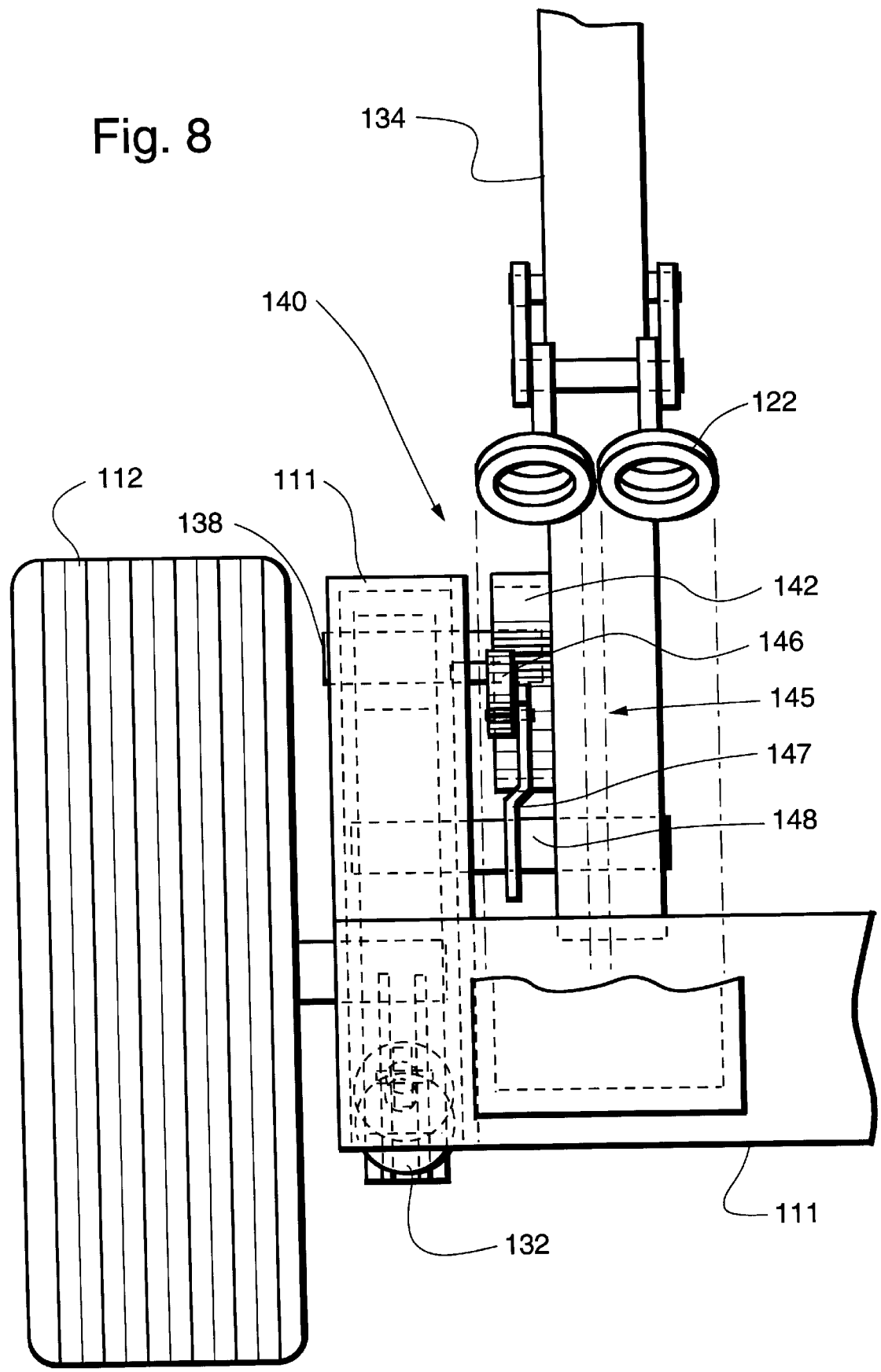
FIG. 8 is an enlarged partial top plan view of the harvester depicting the left header support arm as shown in FIG. 7.
Figure 9:
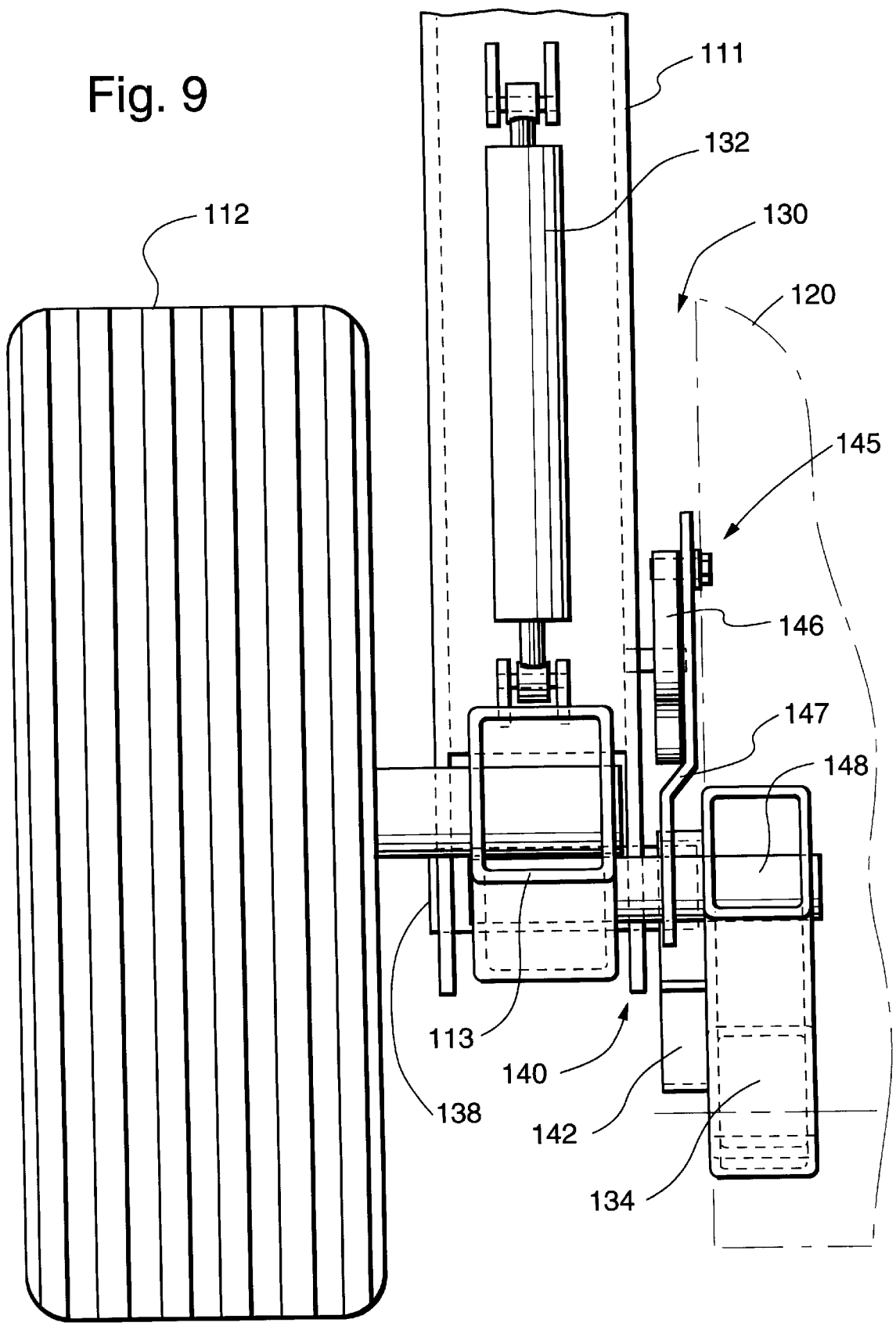
FIG. 9 is a partial rear elevational view of the left header support arm shown in FIG. 8.
Figure 10:
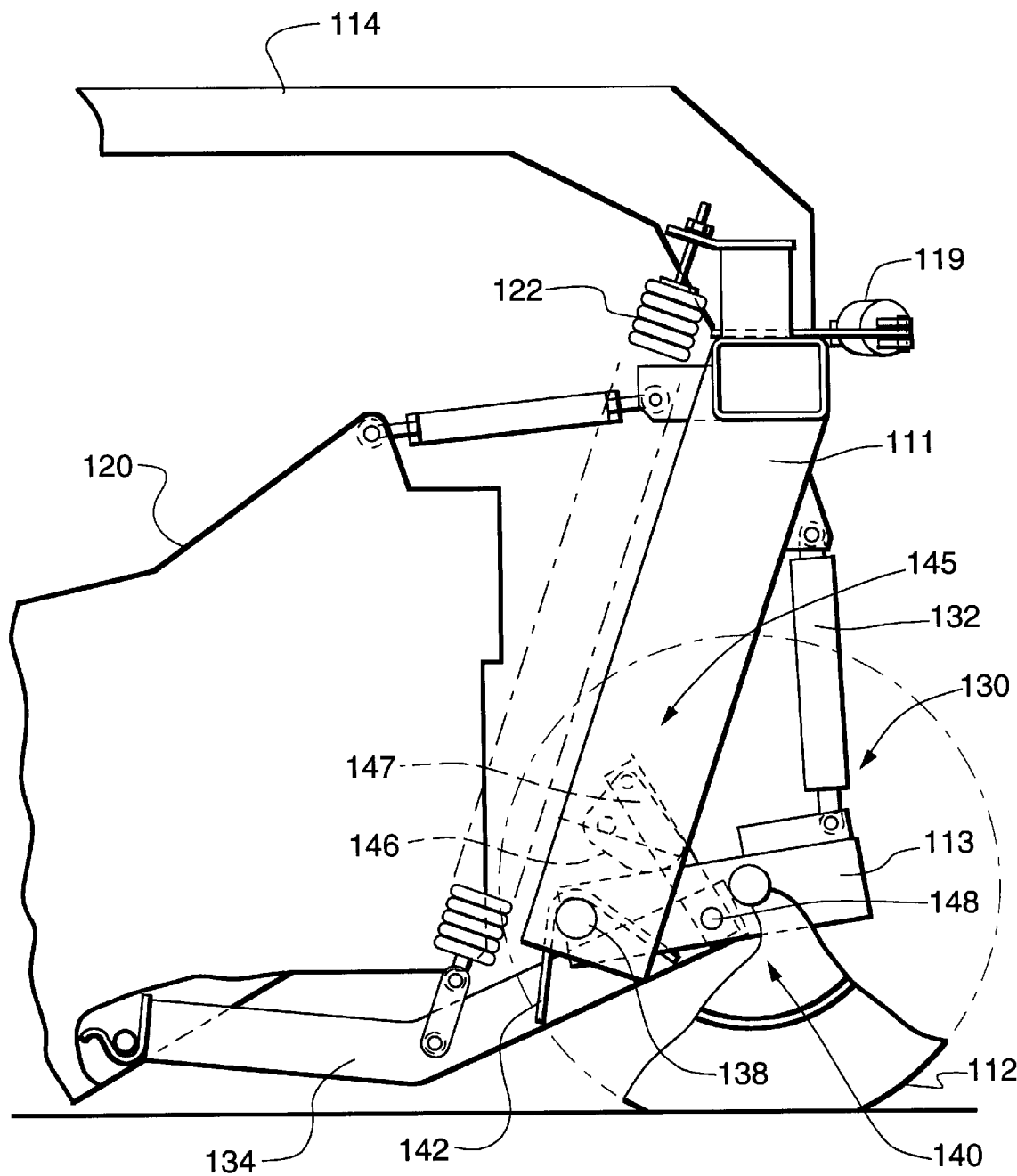
FIG. 10 is a schematic side elevational view of the harvester shown in FIG. 7 with the header in the lowermost operating position with the lower flotation limit engaged.

Referring specifically now to FIGS. 5 and 6, the pivotable lock link 42 can be positioned to move into the stop 44 and the corresponding locked position, as depicted in solid lines. The biasing lever 45 is manually positioned toward the stop 44 by pivoting it about its seat on the pivot pin 46. The extension spring 47 is then applying force to pull the lock link 42 towards the stop 44. When the implement frame 11 is raised by extending the lift cylinders 32, the lock link 42 is pulled by the spring 47 against the stop 44.

As depicted in phantom in FIG. 5, the lock link 42 pivots around and slides past the stop 44 as the stop 44 moves vertically with the extension of the lift cylinders 32 and lodges against the frame 11 beneath the stop 44 as the frame 11 moves into the transport position. As shown in FIG. 6, the stop 44 then rests against the lock link 42, which is held against the frame 11 by the spring 47, and prevents further lowering of the frame 11. An engaging force is maintained on the lock link 42 by the extension spring 47 after the link 42 is engaged by the stop 44. The stop 44 rests on the lock link 42 when the lift cylinder 32 is retracted to lower the frame 11, as shown in FIG. 6. The frame 11 is held in the up or transport position by the lock link 42.

Figure 3:
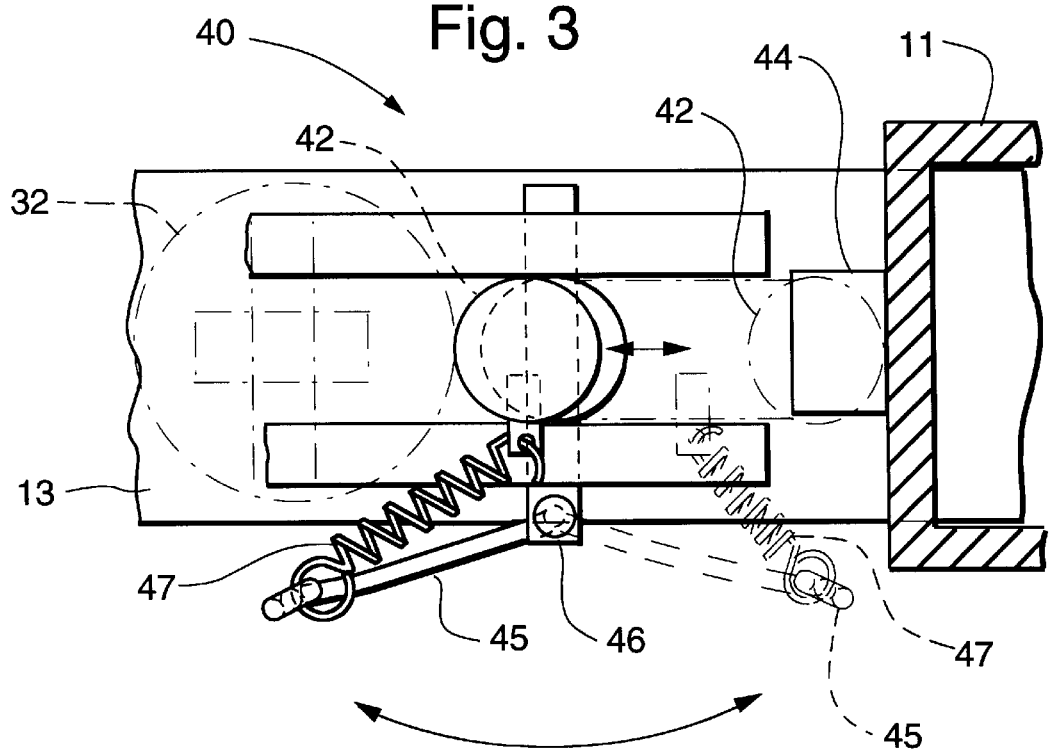
FIG. 3 is an enlarged partial cross-sectional view of the disc mower conditioner taken along lines 3—3 of FIG. 2 to depict a top plan view of the transport latch mechanism incorporating the principles of the instant invention, the movement of the biasing lever into the locking position being shown in phantom.
Figure 4:
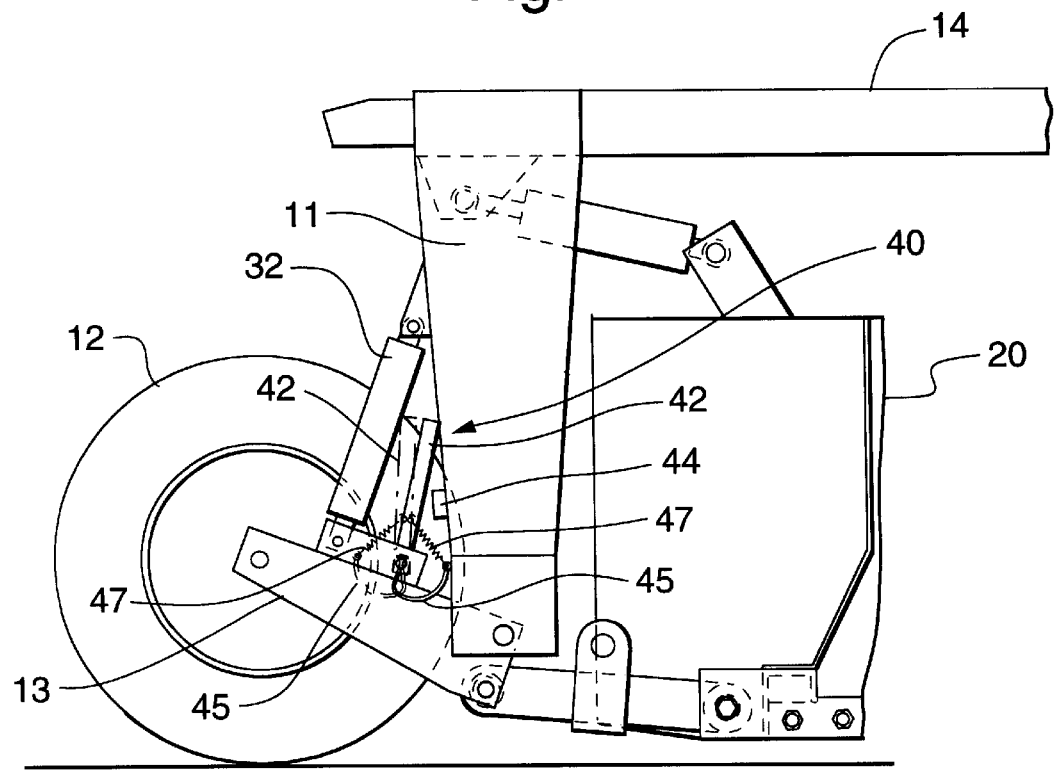
FIG. 4 is a partial side elevational view of the disc mower conditioner with the header being lowered to the operating position and the transport latch being biased into the locking position, the movement of the biasing lever into the unlocking position being shown in phantom.

To disengage the lock link 42 from the stop 44, the biasing lever 45 is pivoted away from the stop 44 as shown in solid lines in FIG. 3 and in phantom in FIG. 4. When the lift cylinder 32 is extended to raise the frame 11 off the lock link 42, the lock link 42 is moved away from the stop 44 due to the force of the extension spring 47 biasing the lock link 42 for movement away from the frame. The spring 47 holds the lock link 42 away from the stop 44 so that the frame 11 can be lowered when the lift cylinder 32 is retracted.

Accordingly, the lock link 42 is biased toward the latched locking position by the pivoted biasing lever 45 and the extension spring 47. The lever 45 positions the spring 47 to pull the lock link 42 into engagement with the stop 44. The spring 47 is effective to bias the lock link 42 both before the link 42 engages the stop 44 and after engagement. The latter ensures that the link 42 will not disengage from its unlocking position to inadvertently engage the stop 44 and be subjected to substantial impact loads, or allow the implement 10 to drop and cause damage thereto. The lock link 42 automatically engages or disengages from the stop 44 when the biasing lever 45 is positioned in one of the other positions. The operator does not have to dismount from the tractor (not shown) to either engage or disengage the latch mechanism 40. The added ease of use will encourage the use of the transport latch mechanism 40.

Referring now to FIGS. 7–12, a mower conditioner 110 having an alternative embodiment of the header lift linkage 140. The draft tongue 114 is pivotally mounted in the center of the frame 111 to permit operative movement of the harvester 110 outboard of the tractor (not shown) to either side thereof. The tongue swing cylinder 119 effects movement of the tongue 114. The header 120 is pivotally supported from the frame 111 for vertical flotational movement relative thereto. Flotation of the header 120 is assisted by the header flotation springs 122. The header 120 can be lifted into a raised transport position by the hydraulic lift cylinders 132 that operate to raise the frame 111 relative to the ground engaging wheels 112 pivotally supported from the frame 111 by wheel arms 113.

Referring now to the enlarged elevational views of FIGS. 8–12, the details of the header lift mechanism 130 can best be seen. The header 120 is supported on the header lift arms 134 to which the header flotation springs 122 are attached. The wheel arms 113 are pivotally connected to the frame 111 by a wheel arm pivot 138 such that an extension of the lift cylinders 132 effects an articulation about the wheel arm pivot 138 as a result of the increased distance between the respective ends of the wheel arm 113 and the top of the frame 111.

The lift linkage 140 includes an inverted U-shaped strap 142 affixed to the side of the header lift arms 134 to be engageable with the wheel arm pivot 138 which terminates in a cantilevered fashion outwardly from the frame 111 in alignment with the strap 142 being positioned above the wheel arm pivot 138. As the header 120 lowers in its flotational movement relative to the frame 111, the header lift arms 134 also lower until the strap 142 engages the wheel arm pivot 138. Accordingly, the engagement of the strap 142 with the wheel arm pivot 138 serves as the lower flotation limit for the header 120.

A cam mechanism 145 is mounted to the frame 111 and positioned above the strap 142. The cam mechanism 145 includes a cam plate 146 pivotally supported on the frame 111 and an actuator arm 147 pivotally connected to the cam plate 146 in an offset manner to the pivotal connection thereof with the frame 111 and also pivotally connected to the pivot pin 148 upon which the header lift arm 134 is mounted from the wheel arm 113. As the lift cylinder 132 extends to articulate the pivotal connection between the wheel arm 113 and the frame 111, the fixed length actuator arm 147 causes a pivotal motion of the cam plate 146 in such a manner that the cam plate 146 shortens the distance between the cam plate 146 and the wheel arm pivot 138 to trap the strap 142 therebetween. As a result, the header flotation is substantially locked out and the header 120 is secured by the time the header 120 reaches the transport position.

Figure 11:
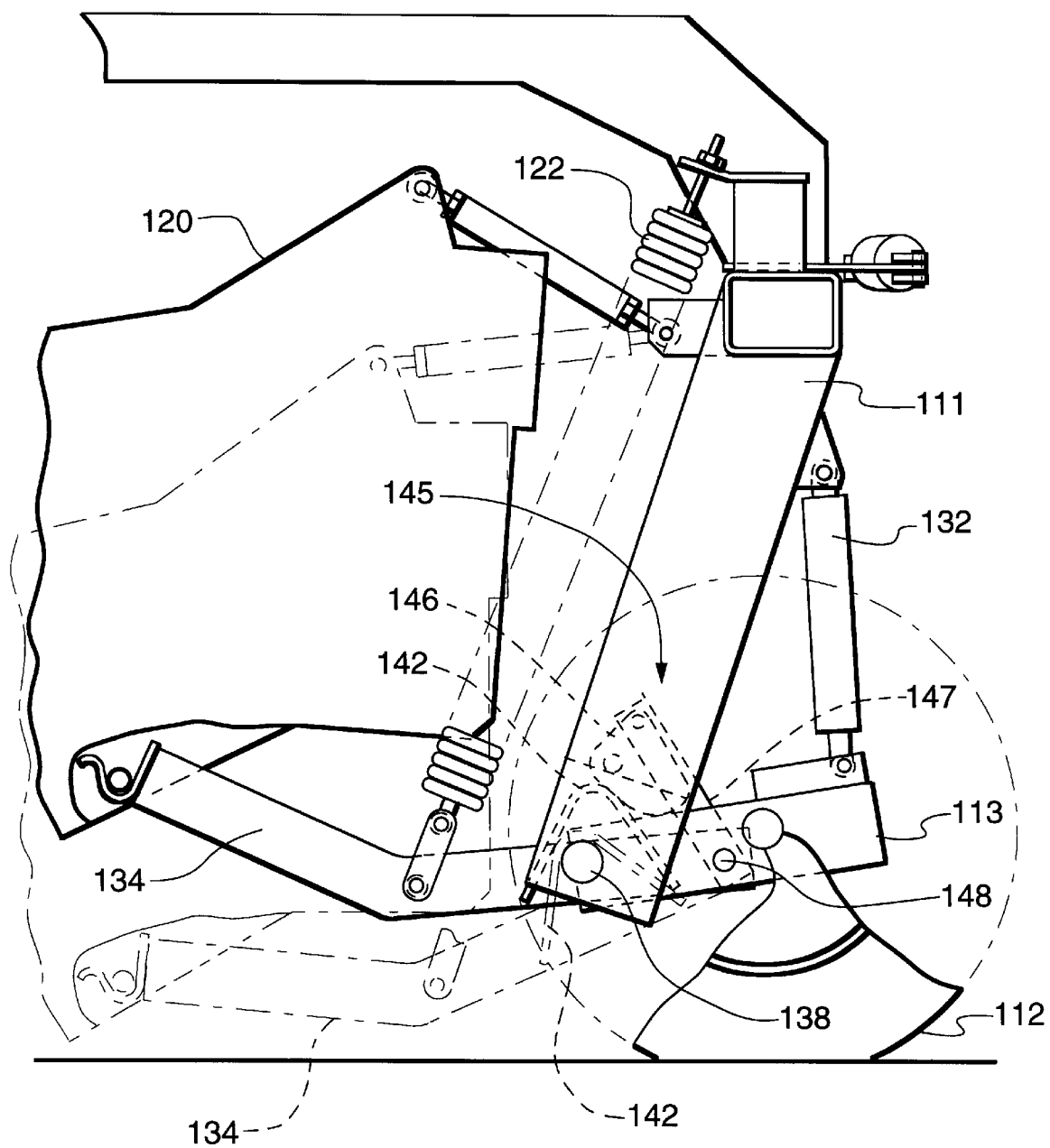
FIG. 11 is a schematic side elevational view similar to that of FIG. 10 but with the header moved to the uppermost flotation position engaging the upper flotation limit, the lowermost flotation position, as depicted in FIG. 10, being shown in phantom.
Figure 12:
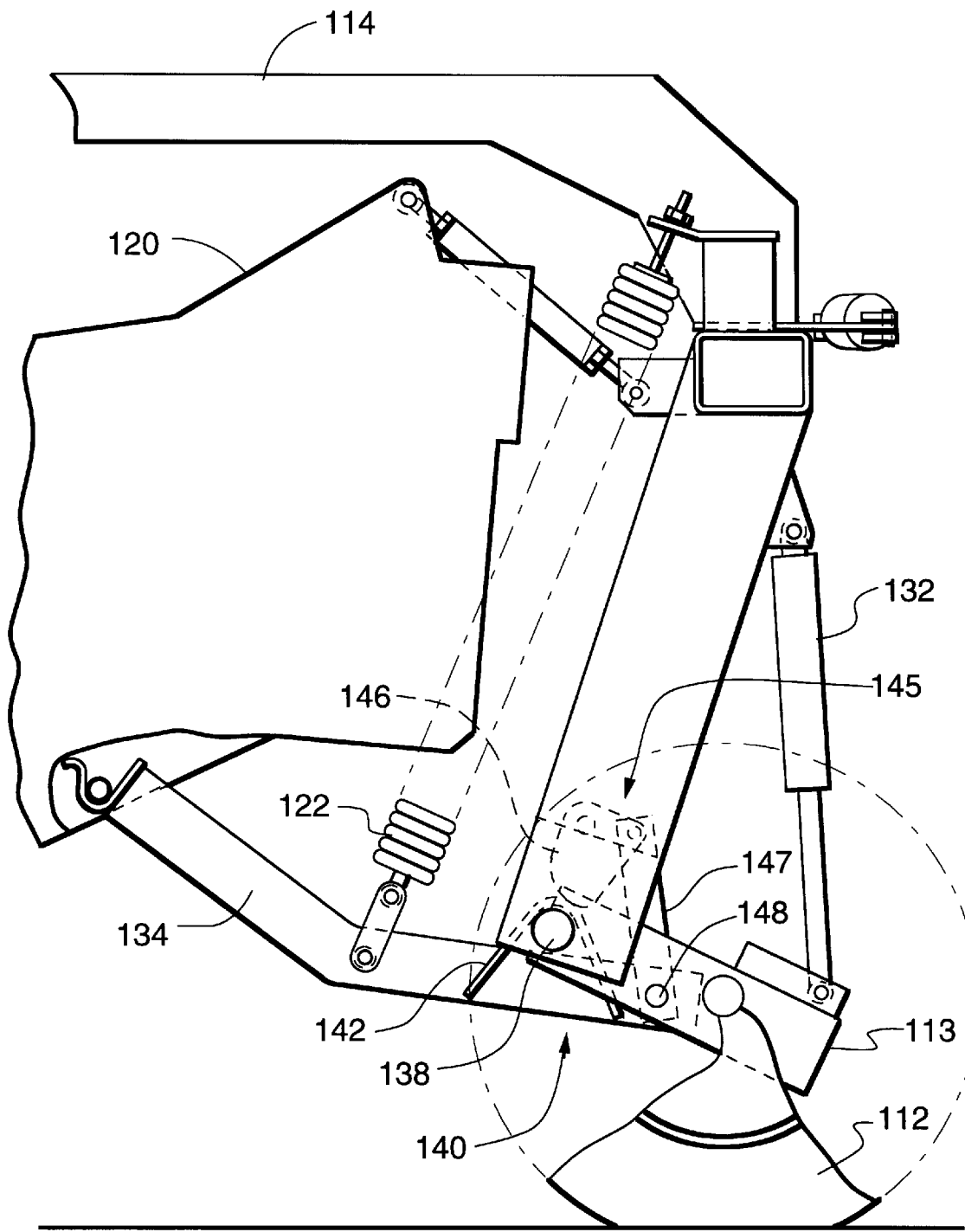
FIG. 12 is a schematic side elevational view similar to that of FIGS. 10 and 11, but with the header moved into the transport position which effects a substantially simultaneous engagement of both the top and bottom flotation limits.

In the normal operating position as shown in dotted lines in FIG. 11, the strap 142 mounted to the side of the header lift arm 134 moves between the wheel arm pivot 138, which serves as the lower flotation limit, and the retracted cam plate 146, which serves as the upper flotation limit. Accordingly, the combination of the wheel arm pivot 138 and the retracted cam plate 146 defines the operating range for the flotation of the header 120. By rotating the cam plate 146 through operation of the actuator arm 147, the operating range reduces to substantially zero as the strap 142 becomes trapped between the pivot 138 and the rotated cam plate 146.

The cam mechanism 145 serves a dual purpose as an upper flotation limit and a device to secure the header 120 from bouncing during transport.

One skilled in the art will readily recognize that the cam plate 146 preferably will not be designed to wedge the strap 142 between the cam plate 146 and the wheel arm pivot 138 as the header 120 should be permitted a slight flexible movement and not be rigidly secured to the frame 111. While the distance between the cam plate 146 and the wheel arm pivot 138 should be minimal to prevent the header 120 from bouncing into the draft tongue 114, this distance should not be completely eliminated.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention. Accordingly, the following claims are intended to protect the invention broadly as well as in the specific form shown.

Having thus described the invention, what is claimed is:

1. In a pull-type harvester having a frame; a crop harvesting header supported from said frame and being movable between a raised transport position and a lowered operative position; a lift mechanism for effecting movement of said header; a header flotation mechanism for assisting a flotational movement of said header relative to said frame within a range of movement proximate to said lowered operative position, an improvement to said flotation mechanism comprising:

a lower flotation stop preventing said header from moving below a lower flotation limit; and a cam mechanism defining an upper flotation limit, said cam mechanism including a cam plate being movable from a first rotated position in which said upper flotation limit is set to define a maximum range of flotational movement and a second rotated position in which said upper flotation limit is set to reduce the range of flotational movement to substantially zero movement.

2. The pull-type harvester of claim 1 further comprising a pair of laterally spaced wheel arms, each of which is pivotally connected to said frame and rotatably supports a ground engaging wheel, said lift mechanism operably interconnecting at least one of said wheel arms and said frame to induce an articulated motion therebetween to effect movement of said header between said transport and operative positions, said cam mechanism further including an actuator arm interconnecting said at least one wheel arm and said cam plate to effect movement of said cam plate between said first and second positions in response to the articulated motion of said at least one wheel arm.

3. The pull-type harvester of claim 2 wherein said cam plate is pivotally mounted on said frame for movement between said first and second positions.

4. The pull-type harvester of claim 3 wherein said header is mounted on a pair of laterally spaced header lift arms pivotally supported from a corresponding one of said wheel arms, said lower flotation stop being a strap attached to at least one of said header lift arms to be engageable with a pivot pin pivotally connecting the corresponding wheel arm to said frame for articulated movement.

5. The pull-type harvester of claim 4 wherein said cam plate is operable to secure said strap between said cam plate and said pivot pin when said cam plate is rotated to said second position.

6. A mower conditioner comprising:

a frame mobilely supported by a pair of laterally spaced ground engaging wheels, each said wheel being pivotally connected to said frame by a wheel arm;

a crop harvesting header forwardly supported from said frame and being movable between a raised transport position and a lowered operative position, said header being mounted on a pair of laterally spaced header lift arms pivotally connected to a corresponding said wheel arm;

a lift mechanism supported by said frame to be operable to effect movement of said header between said transport and operative positions, said lift mechanism being operable to effect an articulation between said wheel arms and said frame to raise said header to said transport position;

a header flotation mechanism for assisting a flotational movement of said header relative to said frame within a range of movement proximate to said lowered operative position, said header flotation mechanism including:

a lower flotation stop preventing said header from moving below a lower flotation limit; and a cam mechanism defining an upper flotation limit, said cam mechanism including a cam plate pivotally mounted to said frame and being movable from a first rotated position in which said upper flotation limit is set to define a maximum range of flotational movement and a second rotated position in which said upper flotation limit is set to reduce the range of flotational movement to substantially zero movement.

7. The mower conditioner of claim 6 wherein said cam mechanism further includes an actuator arm interconnecting one of said wheel arms and said cam plate to effect movement of said cam plate between said first and second positions in response to the articulated motion of said at least one wheel arm, said actuator arm moving said cam plate into said second position whenever said wheel arm is articulated to moved said header into said transport position.

8. The mower conditioner of claim 7 wherein said lower flotation stop is formed as a strap attached to at least one of said header lift arms to be engageable with a pivot pin pivotally connecting a corresponding one of wheel said arms to said frame for articulated movement, said cam plate being operable to secure said strap between said cam plate and said pivot pin when said cam plate is rotated to said second position.

* * * * *